Patented Aug. 1, 1950

2,516,835

UNITED STATES PATENT OFFICE 2,516,835

ALKALI METAL METHOXIDE POLYMERIZATION OF HOMOCYCLIC COMPOUNDS CONTAINING A CARBONYL RADICAL IN THE RING

Earl C. Chapin, Longmeadow, Mass., and George E. Ham, Dayton, Ohio, assignors to Monsanto Chemical Company, St. Louis, Mo., a corporation of Delaware No Drawing. Application February 15, 1949, Serial No. 76,660

8 Claims. (Cl. 260—63)

This invention relates to polymers of cyclic ketones. More particularly the invention relates to an improved method for the preparation of polymers and copolymers of cyclic ketones.

Copolymers of cyclohexanone and methyl cyclohexanone are known to the prior art. These copolymers, however, when made in accordance with the prior art methods are costly and difficult to isolate. The purpose of this invention is to provide new, more efficient, and more economical methods for their preparation.

This invention is useful for the preparation of the copolymers of cyclohexanone and methyl cyclohexanone known to the prior art, and for the preparation of the new polymers described in copending applications Serial No. 76,657 and Serial No. 76,658, filed February 15, 1949, now abandoned, by Earl C. Chapin and George E. Ham. In the former of these applications polymers of isophorone are described and claimed, and in the latter application copolymers of cyclic ketones and aliphatic ketones are described and claimed.

In accordance with the prior art copolymers of cyclohexanone and methyl cyclohexanone were prepared by heating the monomers in the presence of potassium methoxide and methanol in iron autoclaves under pressure. This method is not satisfactory because of the difficulty of separating the polymer from the reaction mass, an extraction with xylene or some other solvent, being required. It has been found that when the same reactions are conducted in the presence of a primary or secondary butyl alcohol, the use of solvents for the extraction of the polymer from the reaction mixture is eliminated. Furthermore, the use of a butanol, other than t-butanol, allows the reaction to be conducted at atmospheric pressure thus obviating the necessity for costly pressure equipment. The specified butanols are unique in that they are not too water-soluble for use, but are still solvents for sodium methoxide and the cyclohexanone polymers, in contrast with higher and lower alcohols.

In accordance with this invention the cyclic ketones, or mixture of cyclic ketones, with or without other ketones, are heated at atmospheric pressure in a substantially non-aqueous medium in a vessel containing sodium methoxide and butyl alcohol. The butyl alcohol is preferably present to the extent of 30 to 500 percent by weight based on the ketones. The reaction is conducted by maintaining the reflux temperature of the reaction mass for a period of time sufficient to produce the desired extent of polymerization, usually three to six hours is sufficient to produce the copolymers in substantial yields. The heating is continued until a polymer with a number average molecular weight of 300 to 1000 is formed.

After the polymerization is completed approximately an equal volume of water is added and the mixture thereafter heated slightly, if necessary, to effect complete destruction of the sodium methoxide. The butanol solution of the cyclohexanone copolymer then separates as a viscous oily layer and is washed with water, dilute sulfuric acid and again with water. The polymers are then separated by evaporation of the butanol, under vacuum if desired.

The method of this invention is useful in the preparation of copolymers of isophorone and cyclic ketones, for example cyclohexanone, cyclopentanone, and their alkylated or halogenated derivatives.

The method of this invention is useful in the preparation of copolymers of cyclic ketones and aliphatic ketones. Useful cyclic ketones for the practice of this modification of the invention are isophorone, cyclohexanone, cyclopentanone, and their alkylated or halogenated derivatives, such as methyl cyclohexanone and chlorocyclohexanone. Useful aliphatic ketones for the practice of this invention are acetone, methyl ethyl ketone, methyl isobutyl ketone, diethyl ketone, methyl isopropyl ketone, and methyl n-butyl ketone.

The copolymers prepared in accordance with this novel method are solid or semi-solid resinous products and are useful as plasticizers for polyvinyl chloride and also as modifying agents for cellulose lacquers.

In copending application Serial No. 76,659 filed February 15, 1949, by Earl C. Chapin and George E. Ham, there are described and claimed plastic compositions made by blending compositions made in accordance with this invention with vinyl chloride polymers. Vinyl chloride polymers which are advantageously plasticized by the use of compounds prepared in accordance with this invention are polyvinyl chloride and copolymers of 50 to 100 percent of vinyl chloride and up to 50 percent of other monomeric compounds, for example vinyl acetate and other vinyl esters of fatty acids, particularly those having one to six carbon atoms, ethyl maleate and other alkyl maleates wherein the alkyl radical has up to eight carbon atoms, ethyl fumarate and other alkyl fumarates wherein the alkyl radical has up to eight carbon atoms, methyl acrylate and other alkyl esters of acrylic acid wherein the alkyl radical has up to eight carbon atoms, methyl methacrylate and other alkyl methacrylates wherein the alkyl radical has up to eight carbon atoms, vinylidene chloride, methacrylonitrile and acrylonitrile.

Further details of this invention are set forth with respect to the following specific examples.

*Example 1*

A glass reaction vessel was charged with 136 parts by weight of butanol, 162 parts of methyl cyclohexanone and 54 parts of cyclohexanone. The vessel was swept out with a stream of dry nitrogen and the gas inlet tube was sealed by means of a drying tube. The reaction was initiated by adding 54 parts of sodium methoxide. After the initial reaction subsided the vessel and its contents were refluxed at 90° C. for eighteen hours. A substantial increase in viscosity had occurred by the time the reaction was complete. The reaction mass was then cooled and an equal volume of water added to decompose the remaining sodium methoxide. The reaction mixture was then heated for ten minutes, and after cooling the viscous oily butanol solution of polymer which separated was decanted and washed three times with equal volumes of water, three times with five percent sulfuric acid and finally again with three volumes of water. The copolymer isolated by the evaporation of the butanol at 140° C. and 15 mm. pressure. The resulting product was an amber colored soft solid having an average number molecular weight of about 317 by a cryoscopic camphor determination.

*Example 2*

Using the procedure described in the preceding example, 136 parts by weight of butanol, 61 parts of sodium methoxide, 43.2 parts of methyl isobutyl ketone, and 172.8 parts of cyclohexanone were reacted. A straw colored copolymer was separated.

*Example 3*

Using the procedure described in the preceding example, 136 parts by weight of butanol, 60 parts of sodium methoxide, 70 parts of isophorone, and 130 parts of cyclohexanone were reacted. The resulting copolymer was found to be compatible with polyvinyl chloride in all proportions.

*Example 4*

Using the procedure described in the preceding examples, 100 parts by weight of cyclopentanone, 26 parts of sodium methoxide, and 100 parts of butanol were reacted at 80° C. for three hours.

The invention is defined by the following claims.

We claim:

1. A method of preparing polymers which comprises contacting a homocyclic compound containing a carbonyl radical in the ring with an alkali metal methoxide in the presence of an alcohol of the group consisting of n-butanol, secondary butanol and primary isobutanol.

2. A method of preparing polymers which comprises contacting a homocyclic compound containing a carbonyl radical in the ring with an alkali metal methoxide in the presence of an alcohol of the group consisting of n-butanol, secondary butanol and primary isobutanol, and heating until a polymer having a normal average molecular weight between 300 and 1000 is effected.

3. A method of preparing polymers which comprises contacting isophorone with an alkali metal methoxide in the presence of an alcohol of the group consisting of n-butanol, secondary butanol and primary isobutanol.

4. A method of preparing polymers which comprises contacting isophorone with an alkali metal methoxide in the presence of an alcohol of the group consisting of n-butanol, secondary butanol and primary isobutanol, and heating until a polymer having a normal average molecular weight between 300 and 1000 is effected.

5. A method of preparing copolymers which comprises contacting a mixture of up to 60 percent by weight of a dialkyl ketone and more than 40 percent of isophorone, with an alkali metal methoxide in the presence of an alcohol of the group consisting of n-butanol, secondary butanol and primary isobutanol.

6. A method of preparing copolymers which comprises contacting a mixture of up to 60 percent by weight of a dialkyl ketone and more than 40 percent of isophorone with an alkali metal methoxide, in the presence of an alcohol of the group consisting of n-butanol, secondary butanol and primary isobutanol, and heating to effect a normal average molecular weight between 300 and 1000.

7. A method of preparing copolymers which comprises contacting a mixture of up to 60 percent by weight of acetone and more than 40 percent of isophorone, with an alkali metal methoxide in the presence of an alcohol of the group consisting of n-butanol, secondary butanol and primary isobutanol.

8. A method of preparing copolymers which comprises contacting a mixture of up to 60 percent by weight of acetone and more than 40 percent of isophorone, with an alkali metal methoxide in the presence of an alcohol of the group consisting of n-butanol, secondary butanol and primary isobutanol, and heating to effect a normal average molecular weight between 300 and 1000.

EARL C. CHAPIN.
GEORGE E. HAM.

REFERENCES CITED

The following references are of record in the file of this patent:

UNITED STATES PATENTS

| Number | Name | Date |
| --- | --- | --- |
| 2,171,882 | Ludwig | Sept. 5, 1939 |
| 2,317,663 | Allen | Apr. 27, 1943 |

FOREIGN PATENTS

| Number | Country | Date |
| --- | --- | --- |
| 560,598 | Great Britain | Apr. 12, 1944 |